(12) United States Patent
Wang et al.

(10) Patent No.: US 8,718,045 B2
(45) Date of Patent: May 6, 2014

(54) SYSTEM AND METHOD FOR SWITCHING BETWEEN PUBLIC SWITCHED TELEPHONE NETWORKS AND VOICE OVER INTERNET PROTOCOL NETWORKS

(75) Inventors: Pei-Yu Wang, New Taipei (TW); Chien-Ju Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 110 days.

(21) Appl. No.: 13/191,470

(22) Filed: Jul. 27, 2011

(65) Prior Publication Data

US 2012/0263170 A1 Oct. 18, 2012

(30) Foreign Application Priority Data

Apr. 15, 2011 (CN) .......................... 2011 1 0094922

(51) Int. Cl.
*H04L 12/66* (2006.01)
(52) U.S. Cl.
USPC ........................................ 370/352; 370/250
(58) Field of Classification Search
USPC .................................................. 370/352, 250
See application file for complete search history.

(56) References Cited

U.S. PATENT DOCUMENTS

| | | | | |
|---|---|---|---|---|
| 6,542,499 | B1 * | 4/2003 | Murphy et al. ............... | 370/352 |
| 6,981,022 | B2 * | 12/2005 | Boundy ........................ | 709/204 |
| 7,352,847 | B2 * | 4/2008 | Goldman et al. ............... | 379/45 |
| 7,489,925 | B2 * | 2/2009 | Fry et al. ..................... | 455/426.1 |
| 7,496,360 | B2 * | 2/2009 | Sindhwani et al. ......... | 455/422.1 |
| 7,567,549 | B2 * | 7/2009 | Adan et al. .................... | 370/352 |
| 7,693,136 | B1 * | 4/2010 | Blair et al. .................... | 370/352 |
| 7,746,797 | B2 * | 6/2010 | El-Hennawey et al. ...... | 370/250 |
| 7,894,406 | B2 * | 2/2011 | Goldman et al. ............. | 370/338 |
| 7,912,036 | B2 * | 3/2011 | Moore .......................... | 370/352 |
| 8,107,957 | B1 * | 1/2012 | O'Neil et al. ................. | 455/436 |
| 8,130,750 | B2 * | 3/2012 | Hester .......................... | 370/352 |
| 2002/0122417 | A1 * | 9/2002 | Miller et al. .................. | 370/352 |
| 2006/0187904 | A1 * | 8/2006 | Oouchi ........................ | 370/352 |
| 2007/0165611 | A1 * | 7/2007 | Yang et al. .................... | 370/356 |
| 2007/0223455 | A1 * | 9/2007 | Chang et al. .................. | 370/352 |
| 2009/0023450 | A1 * | 1/2009 | George et al. ................ | 455/442 |
| 2012/0177029 | A1 * | 7/2012 | Hillier et al. .................. | 370/352 |
| 2013/0070667 | A1 * | 3/2013 | Ku et al. ....................... | 370/328 |

* cited by examiner

*Primary Examiner* — Hassan Kizou
*Assistant Examiner* — Abdullahi Ahmed
(74) *Attorney, Agent, or Firm* — Novak Druce Connolly Bove + Quigg LLP

(57) ABSTRACT

A location customer premise equipment (CPE), the location CPE in electronic communication with a location telephone, a remote CPE and a remote telephone. The location CPE includes a first processor. The first processor receives a switch signal from the location telephone, and sends a corresponding first request signal to the remote CPE, and then the first processor receives a corresponding first response signal and a phone number of an unused network of the remote telephone from the remote CPE, and dials the phone number of an unused network to establish an unused network communication link with the remote CPE and cuts off a used network communication link.

7 Claims, 2 Drawing Sheets

SYSTEM AND METHOD FOR SWITCHING BETWEEN PUBLIC SWITCHED TELEPHONE NETWORKS AND VOICE OVER INTERNET PROTOCOL NETWORKS

BACKGROUND

1. Technical Field

The disclosure generally relates to communication systems, and particularly to systems and methods for switching between a public switched telephone network (PTSN) and a Voice over internet protocol (VoIP) network.

2. Description of Related Art

The VoIP is a protocol for transmitting sounds/images through an open network, providing call services through a packet signal. However, the VoIP is restricted by many factors such that speech quality using the VoIP may be poor, signals may be unstable, and lines between one or more people may be disconnected.

A typical landline phone is generally used in daily communication, where the phone is coupled to the PSTN to provided calling services. Although the charge of the traditional phone is very high, it is not limited by many factors associated with the internet, unlike VoIP.

Thus, users may need to switch freely between a VoIP network and PSTN according to their actual requirements.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure

DETAILED DESCRIPTION

Figure 1:
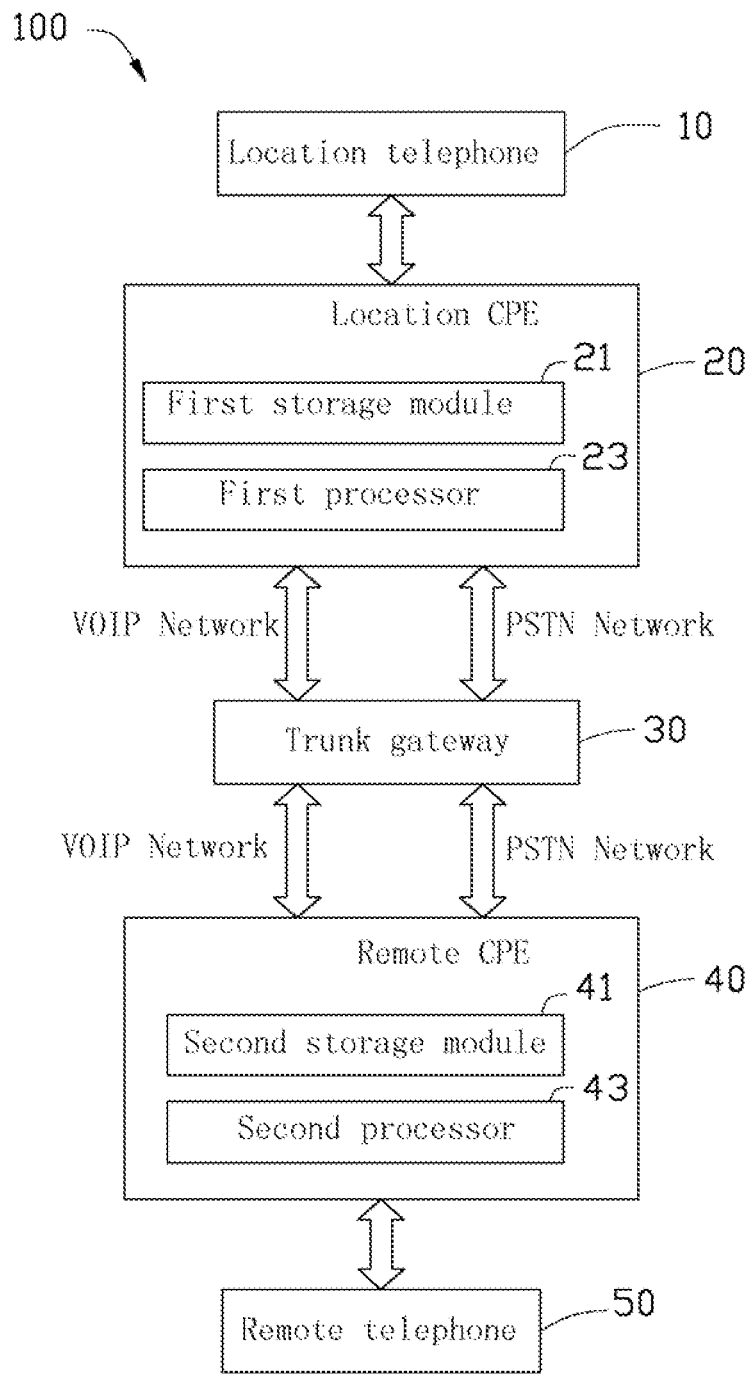
FIG. 1 is a block diagram of a system for switching between a PSTN and a VoIP network, according to an exemplary embodiment.

Referring to FIG. 1, a system 100 for switching between a PSTN and a VoIP network includes a location telephone 10, a location customer premise equipment (CPE) 20, a trunk gateway 30, a remote CPE 40 and a remote telephone 50. The location telephone 10 and the remote telephone 50 are respectively connected to the location CPE 20 and the remote CPE 40. The location CPE 20 and the remote CPE 40 can communicate with each other in a PSTN or a VoIP network by the trunk gateway 30. Thus, the location telephone 10 and the remote telephone 50 can make a PSTN call or a VoIP call with each other.

The location telephone 10 and the remote telephone 50 both have a PSTN phone number and a VoIP phone number respectively corresponding to the PSTN and the VoIP network.

The location telephone 10 includes a plurality of function keys. Each function key corresponds to a dual tone multi-frequency (DTMF) signal. When the function key is pressed, the corresponding DTMF signal can be sent to the remote telephone 50 to realize a corresponding operation, such as dialing the PSTN or VoIP phone number. The function keys also include a switch key. The switch key can be a single key or a combination of keys corresponding to a switch signal. For example, the switch key may correspond to a key with "*" symbol or a combination of keys with "*" symbol and "0" symbol. The switch signal can be sent to the location CPE 20 to switch a current call from a current used network to an unused network.

The unused network and the used network both selected from one only of the PSTN and the VoIP network, the selection being mutually exclusive (i.e., one of the networks is the PSTN network and another one of the networks is the VoIP network). In this exemplary embodiment, as illustrated, the current used network is the PSTN. A PSTN communication link between the location CPE 20 and the remote CPE 40 is established. The unused network is the VoIP network.

The remote telephone 50 is substantially similar to the location telephone 10. The remote telephone 50 also has a switch key corresponding to the switch signal. The switch signal can be sent from the remote telephone 50 to the remote CPE 40 to switch the current call from the PSTN to the VoIP network. The location CPE 20 includes a first storage module 21 (e.g., a hard disk drive) and a first processor 23. The first storage module 21 stores the PSTN phone number and the VoIP phone number of the location telephone 10. The first processor 21 can receive, process and transmit data. The first storage module 21 also temporarily store data to be processed or transmitted by the first processor 23 and programs to be executed by the first processor 23.

When the switch key of the location telephone 10 is pressed, the first processor 23 receives the switch signal from the location telephone 10 and sends a corresponding first request signal to the remote CPE 40. The first request signal is used for notifying the remote CPE 40 that the location telephone 10 wants to switch the current call from the PSTN to the VoIP network. Then, the first processor 23 receives a corresponding first response signal and the VoIP phone number of the remote telephone 50 from the remote CPE 40. The first processor 23 dials the received VoIP phone number of the remote telephone 50 and makes a VoIP call with the remote telephone 50. Thus, a VoIP communication link is established between the location CPE 20 and the remote CPE 40. Then, the first processor 23 cuts off the PSTN communication link and maintains the VoIP communication link. Therefore, the current call is transferred from the PSTN to the VoIP network.

In addition, when the switch key of the remote telephone 50 is pressed, the first processor 23 receives a second request signal from the remote CPE 40. The first processor 23 sends a corresponding second response signal and the VoIP phone number of the location telephone 20 to the remote CPE 40.

The remote CPE 40 is substantially similar to the location CPE 20 including a second storage module 41 and a second processor 43. The second storage module 41 stores the PSTN phone number and the VoIP phone number of the remote telephone 50.

When the switch key of the location telephone 10 is pressed, the second processor 43 receives the first request signal from the first processor 23 and sends the corresponding first response signal and the VoIP phone number of the remote telephone 50 to the first processor 23.

In addition, when the switch key of the remote telephone 50 is pressed, the second processor 43 receives the switch signal from the remote telephone 50 and sends a corresponding second request signal to the first processor 23 of the location CPE 20. Then, the second processor 43 receives the corresponding second response signal and the VoIP phone number of the location telephone 10 from the location CPE 20. The second processor 43 dials the VoIP phone number of the location telephone 10 and makes a VoIP call with the location telephone 10. Thus, a VoIP communication link is established between the location CPE 20 and the remote CPE 40. Then, the second processor 43 cuts off the PSTN communication link and maintains the VoIP communication link. Therefore, the current call is transferred from the PSTN to the VoIP network.

The location CPE 20 and the remote CPE 40 may be selected from one of the group consisting of a VoIP gateway, a router, a terminal adapter, an IP private branch exchange (PBX), a digital subscriber line (DSL) modem and a cable modem (CM).

Figure 2:
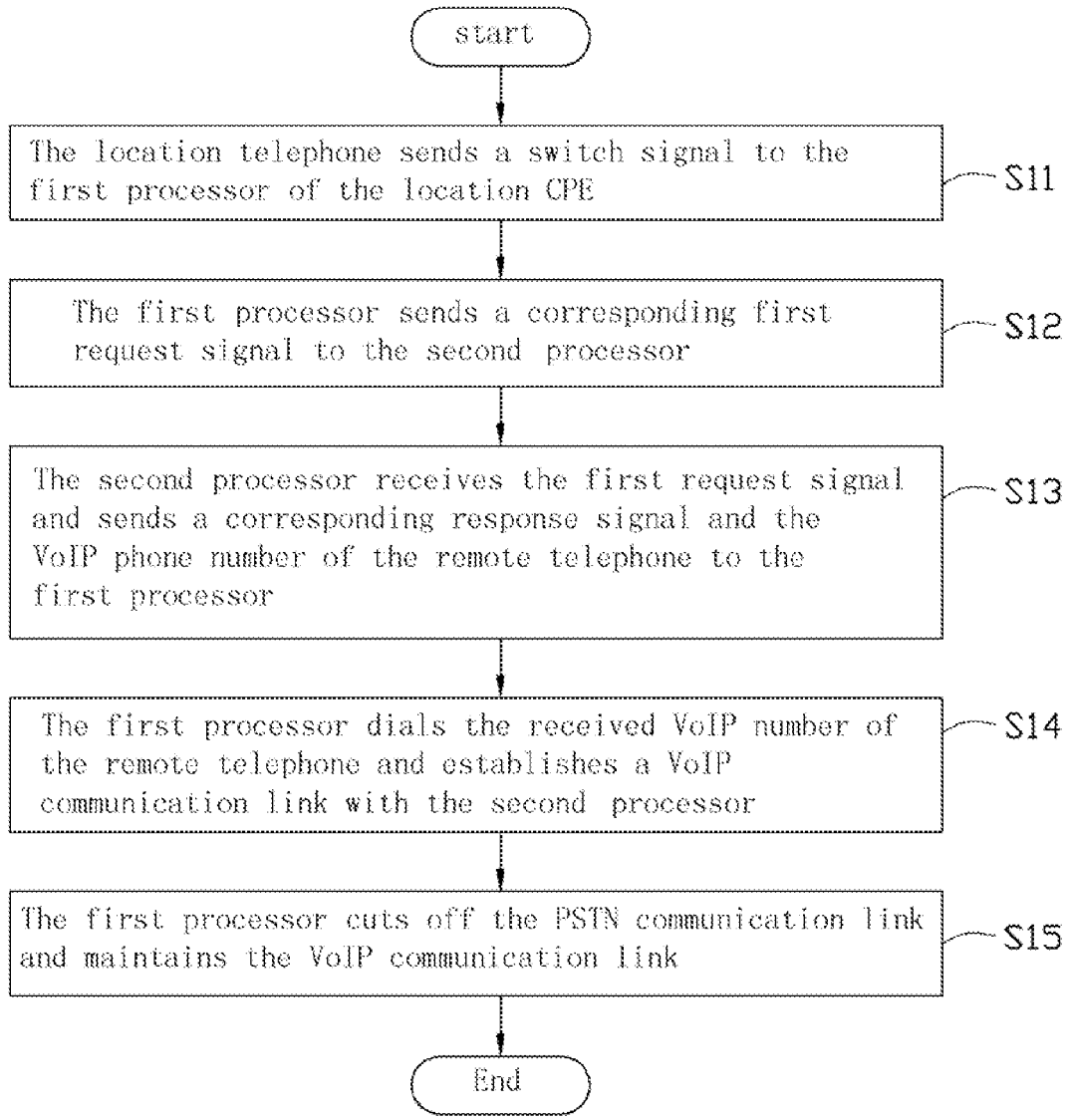
FIG. 2 is a flowchart of a process for switching between a PSTN and a VoIP network, according to an exemplary embodiment.

Referring to FIG. 2, in this embodiment, the switch key of the location telephone 10 is pressed, and the method is for transferring a call from a PSTN to a VoIP network, may include steps below. It should be known that depending on the embodiment, additional or less steps may be added or the ordering of the steps may be changed.

In step S11, the location telephone 10 sends a switch signal to the first processor 23 of the location CPE 20.

In step S12, the first processor 23 sends a first request signal to the second processor 43 of the remote CPE 40 corresponding to the switch signal.

In step S13, the second processor 43 receives the first request signal and sends a corresponding response signal and the VoIP phone number of the remote telephone 50 to the first processor 23.

In step S14, the first processor 23 dials the received VoIP number of the remote telephone 50 and makes a VoIP call with the remote telephone 50. Thus, VoIP communication link is established between the first processor 23 and the second processor 43.

In step S15, the first processor 23 cuts off the PSTN communication link and maintains the VoIP communication link. Thus, the current call between the location telephone 10 and the remote telephone 50 is transferred from the PSTN to the VoIP network.

Therefore, users of the location telephone 10 or remote telephone 50 can freely switch a call between a VoIP network and PSTN according to their actual requirements.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A location customer premise equipment (CPE), the location CPE in electronic communication with a location telephone, a remote CPE and a remote telephone, wherein the location telephone and the remote telephone communicate via a public switched telephone network (PSTN) and a Voice over internet protocol (VoIP) network, the location CPE comprising:

a first storage module;

a first processor; and one or more programs stored in the storage module and the programs executed by the first processor, the one or more programs comprising:

receiving a switch signal from the location telephone when the location telephone make a VoIP call with the remote telephone; wherein the switch signal represents that the location telephone desires to switch the VoIP call to a PSTN call;

sending a corresponding first request signal to the remote CPE;

receiving a corresponding first response signal and a phone number of the PSTN network of the remote telephone from the remote CPE;

dialing a phone number of the PSTN network of the remote telephone to establish an PSTN network communication link with the remote CPE; and cutting off a VoIP network communication link between the location CPE and the remote CPE.

2. The location CPE of claim 1, wherein the first storage module also stores a PSTN telephone number and a VoIP telephone number of the location telephone.

3. The location CPE of claim 1, wherein the location CPE is selected from one of the group consisting of a VoIP gateway, a router, a terminal adapter, an IP private branch exchange, a digital subscriber line modem, and a cable modem.

4. A remote customer premise equipment (CPE), the remote CPE in electronic communication with a remote telephone, a location CPE and a location telephone, wherein the location telephone and the remote telephone communicate via a public switched telephone network (PSTN) and a Voice over internet protocol (VoIP) network, the remote CPE comprising:

a second storage module;

a second processor; one or more programs stored in the storage module and executed by the second processor, the one or more programs comprising:

receiving a first request signal from the location CPE when the location telephone make a VoIP call with the remote telephone; wherein the first request signal represents that the location telephone desires to switch the VoIP call to a PSTN call; and sending a first response signal and a phone number of the PSTN network of the remote telephone to the location CPE.

5. The remote CPE of claim 4, wherein the second storage module also stores the PSTN telephone number and the VoIP telephone number of the remote telephone.

6. The remote CPE of claim 4, wherein the remote CPE is selected from one of the group consisting of a VoIP gateway, a router, a terminal adapter, an IP private branch exchange, a digital subscriber line modem and a cable modem.

7. A method for switching between a public switched telephone network (PSTN) and a Voice over internet protocol (VoIP) network, the method comprising:

receiving a switch signal from a location telephone when the location telephone make a VoIP call with the remote telephone; wherein the switch signal represents that the location telephone desires to switch the VoIP call to a PSTN call;

sending a corresponding request signal to a remote CPE by a trunk gateway;

receiving a corresponding response signal and a telephone number of the PSTN network of a remote telephone from the remote CPE;

establishing an the PSTN network communication link by dialing the telephone number of the the PSTN network; and cutting off a VoIP network communication link between the location CPE and the remote CPE.

* * * * *